United States Patent
Held

(10) Patent No.: US 6,180,211 B1
(45) Date of Patent: Jan. 30, 2001

(54) COMPOSITE LAMINATE AND METHOD THEREFOR

(76) Inventor: Russell K. Held, 7591 N. U.S. 131, Manton, MI (US) 49663

( * ) Notice: Under 35 U.S.C. 154(b), the term of this patent shall be extended for 0 days.

(21) Appl. No.: 09/285,417

(22) Filed: Apr. 2, 1999

Related U.S. Application Data

(60) Provisional application No. 60/080,561, filed on Apr. 3, 1998, now abandoned.

(51) Int. Cl.[7] .................................................. B37B 3/00
(52) U.S. Cl. ..................... 428/172; 428/35.7; 428/36.1; 428/36.2; 428/193; 428/200; 428/221; 428/172; 428/902; 428/537.1; 442/255; 427/207.1; 427/208.2; 427/208.4; 427/389.9
(58) Field of Search ................................. 428/35.7, 36.1, 428/36.2, 193, 200, 221, 172, 902, 832.2; 442/255; 427/207.1, 208.2, 208.4, 389.9

(56) References Cited

U.S. PATENT DOCUMENTS

| | | |
|---|---|---|
| 4,753,847 | 6/1988 | Wilheim et al. . |
| 4,770,931 | 9/1988 | Pollock et al. . |
| 4,801,632 | 1/1989 | Eichenauer et al. . |
| 4,942,005 | 7/1990 | Pollock et al. . |
| 5,133,835 | 7/1992 | Goettmann et al. . |
| 5,274,199 | 12/1993 | Uryu et al. . |
| 5,422,175 | 6/1995 | Ito et al. . |
| 5,474,837 | 12/1995 | Duke, Jr. et al. . |

OTHER PUBLICATIONS

Creasy, Lara, "Natural fibers may be starting to grow on U.S. carmakers," *Automotive & Transportation Interiors*, Apr. 1998, pp. 46–49.

Lebovitz, Richard, "Debunking Tier Two myths," *Automotive & Transportation Interiors*, Nov., 1998, p. 4.

Creasy, Lara, "Look Out Overhead," *Automotive & Transportation Interiors*, Dec. 1997, pp. 28–33.

Primary Examiner—Richard Weisberger

(57) ABSTRACT

A composite laminate including an exterior face material, such as a wood veneer, fabric or thin metal is disclosed for use with a fiber impregnated substrate having a polyester backing sheet thereon. The composite laminate of this invention eliminates the need for an adhesive between the polyester sheet and the substrate.

10 Claims, 1 Drawing Sheet

COMPOSITE LAMINATE AND METHOD THEREFOR

CROSS-REFERENCE TO RELATED APPLICATIONS

This application claims the benefit of provisional application Ser. No. 60/080,561 filed Apr. 3, 1998, abandoned.

TECHNICAL FIELD

The present invention relates to a composite laminate comprising an exterior face layer, such as a wood veneer, fabric, or thin metal sheet, onto a fiber impregnated substrate with a polyester backing sheet thereon. A novel feature of this composite laminate is the elimination of the need for a composite adhesive between the polyester sheet and the fiber impregnated substrate.

BACKGROUND ART

Wood veneers and other composite laminates made from natural materials have grown increasingly popular in an effort to balance aesthetic qualities with functionality. For instance, functional as well as aesthetically pleasing articles such as headliners, furniture and other home accessories are made from laminates of wood veneer. As wood is susceptible to a wide range of natural variations in color, grain size, grain direction, humidity content and the like, single layer wood veneers warp and/or twist due to the anisotropy of the natural grain of the wood. For specific applications requiring a thicker wood veneer, multiple layers of wood veneer are glued together to form a wood laminate. However, if the grain of each of the veneer layers is oriented in the same direction, the multi-layer veneer laminate will warp in the same fashion as a single layer veneer. In addition, excessive warpage will cause the wood layers to delaminate. Therefore, in multi-layer laminates of wood veneers, the veneer layers are staged in alternating "with-grain" and "cross-grain" directions in order to minimize warpage of the finished laminate. However, to properly orient the "cross-grain" layers so as to effectively limit warpage necessitates a costly and labor-intensive "stitching" step. Without the "stitching" step, the finished laminate will exhibit unacceptably high warping or twisting.

Moreover, in order to securely bond rigid wood laminates of more substantial cross-sections requires high pressures and high temperatures in order to ensure that the adhesive between the laminate layers cures properly. This process is however highly energy intensive and requires a longer cycle time to facilitate full heat penetration of the laminate through the cross-section. This longer cycle time results in lower productivity, and under-utilization of capital equipment. Accordingly, to produce a given production volume, additional capital outlays are necessitated, such as tooling and equipment costs.

Another problem inherent to the longer cycle times of conventional processes is the pre-curing of the batch adhesive. Longer cycle times create another problem associated with the batch adhesive pre-curing prior to the end of the production run.

Lastly, the use of adhesives in formable composite laminates not only increases cost, and quality issues if the adhesive is not properly cured, but further raises environmental hazards.

Another method to increase the thickness of a wood veneer is to laminate a thin veneer to a more substantial substrate of a different material, such as a plastic sheet. However, differences in the coefficient of thermal expansion between wood and plastic resins causes unacceptable delamination.

Accordingly, there is a need for a formable composite laminate that is durable enough to function effectively over a wide range of applications and yet eliminate the need for a composite adhesive and the problems associated therewith.

DISCLOSURE OF INVENTION

The present invention is a composite laminate having an exterior face layer, such as a wood veneer, fabric, cloth, cork, foil, vinyl film, formable thin metal sheet, or card stock face layer or layers, and a substrate comprised of at least one layer of a vegetable or wood-fiber impregnated, preferably cellulose-impregnated, thermoplastic material, with a polyester backing sheet thereon. The finished composite laminate is cold-pressed to achieve bonding between the layers of the composite laminate. The resultant composite laminate is more flexible than wooden boards or veneers due to the vegetable or wood-fiber impregnated thermoplastic substrate and the polyester backing sheet. This increased flexibility allows the composite laminate to be formed into a variety of complex shapes and thus has great utility for a wide range of applications.

BEST MODE FOR CARRYING OUT THE INVENTION

Figure 1:
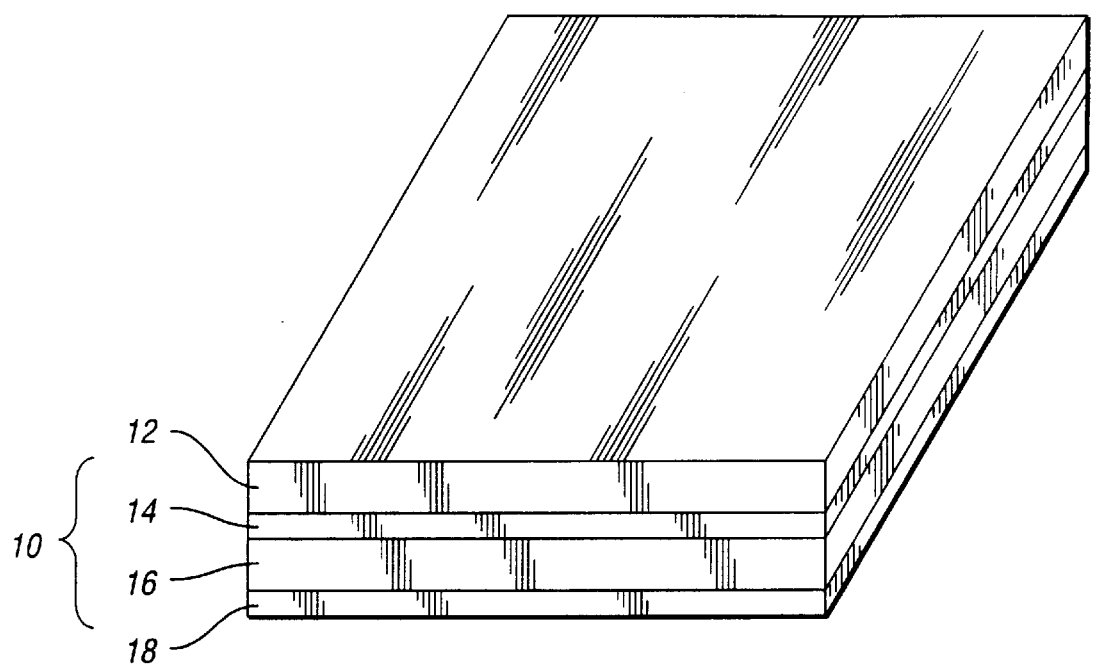
FIG. 1 depicts an embodiment of the composite laminate of the present invention.

FIG. 1 depicts an embodiment of the composite laminate of the present invention. In this embodiment, and as depicted in FIG. 1, the composite laminate sheet 10 is comprised of an exterior face layer 12, an adhesive 14, and a substrate 16 with a polyester backing sheet 18. The exterior face layer 12 can be composed of a variety of materials such as wood veneer, fabric, cloth, cork, foil, formable thin sheet or card stock face layer(s). The substrate 16 is preferably composed of at least one layer of a vegetable or wood-fiber impregnated plastic resin, preferably a thermoplastic resin.

The process to fabricate the present invention involves die cutting an exterior face layer 12 as well as the substrate 16 and polyester backing sheet 18, into a predetermined shape, one suited for the desired finished article. The exterior face layer 12 is selected to suit the desired finished article. For example, for wood trim parts, a wood veneer may be used as the exterior face layer 12, or for headliner applications, a fabric such as wool or felt may be used. The substrate 16 in the preferred embodiment, a cellulose-impregnated thermoplastic material, and the polyester backing sheet 18, are then pre-heated to a temperature sufficient to cause the two materials to become flexible and thus responsive to compression under a compressive force. The pre-heat temperature of course varies with the materials selected. As an example, for a polyester layer an appropriate pre-heat temperature is in the range of 150–200° C. Preferably, the substrate 16 and the polyester backing sheet 18 are kept at this temperature for a duration sufficient to achieve the desired flexibility.

While not wishing to be bound to any particular theory, it is believed, that this pre-heating step causes the impregnated substrate to penetrate through the open weave of the polyester backing sheet 18 and create a mechanical bond therebetween during the forming step. It is further believed that the application of pressure forces the pre-heated and softened materials together, causing the substrate resin to set into the open weave of the polyester backing sheet 18 upon cooling.

Immediately following the pre-heating step, the exterior face layer 12, the substrate 16 and the polyester backing sheet 18 are cold formed in a laminate press. Depending upon the thickness and shape of the laminate article, the mold dwell time should be adjusted. To ensure a short cycle time, it is preferred that the compression dies of the laminate press have a metal surface, preferably steel, aluminum, or any other suitable metallic surface. Although, non-metallic surfaces function adequately, a metallic surface quickly dissipates the heat of the substrate, thereby shortening cycle time. If an adhesive is required to bond the exterior face layer to either the substrate or the polyester backing sheet, such an adhesive is also loaded into the compression tool. While the substrate and polyester backing sheet are still hot from the pre-heating step, the substrate, polyester backing sheet and the exterior face layer are compressed to achieve cure therebetween during the cooling phase. After compression, a formed and bonded part is removed from the compression tool. This compression step is slightly modified if the exterior face layer comprises a metal. In such cases, the metal is preferably scuff sanded on the side to be bonded to and pre-heated, generally at a temperature higher than the melting point for the substrate and polyester backing sheet. A higher pre-heating temperature is generally called for with metal exterior face materials since the metal exterior face material works in conjunction with adhesives having a higher melting point. Following the pre-heating step, the metal exterior face layer, an appropriate adhesive, the substrate and polyester backing sheet are loaded into the compression tool to achieve compression bonding during the cooling phase.

To further reduce cycle time, the exterior face layer can be loaded into a heated assembly either as an individual blank or from a roll-feed. The broad range of exterior face materials compatible with this composite sheet laminate creates the possibility for many different uses of this composite laminate.

In another embodiment, the formed composite sheet can be loaded into an injection mold where appropriate plastic resins are injected onto the polyester backing sheet and bonded mechanically therein. For example, if a mechanical fastener, crimp plate, or the like is to be attached to the composite laminate, plastic resin can be selectively injected in the specific attachment areas, thus saving significant material, weight and unnecessary expense. In addition, the ability to injection mold specific attachments directly onto the composite laminate, eliminates concerns associated with differential shrinkage when the plastic resin is applied to the entire back surface.

Figure 2:
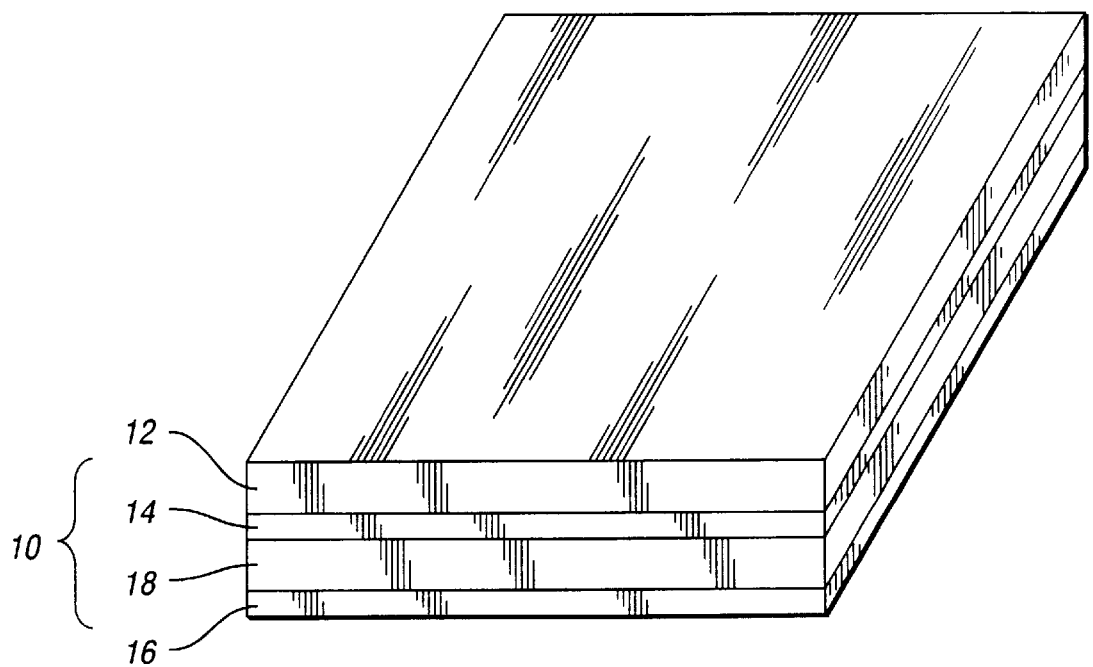
FIG. 2 depicts an embodiment of the composite laminate for headliner applications.

This composite laminate also has great application in the automotive industry for headliner applications. For such applications, and as depicted in FIG. 2, the exterior face layer 12 is generally a fabric, such as a wool or felt material, which can be loaded in the compression tool as either individual blanks or roll-fed through the press across the tool. After the pre-heating step, an adhesive 14 is then loaded against the fabric exterior facing layer 12 followed by a polyester backing sheet 18 in mating contact with the adhesive layer 14. The impregnated substrate 16 is then used as a stiffener on the back side of the polyester sheet 18. For headliner applications, the open weave of the polyester backing sheet 18 serves as an acoustical sound absorber and carrier for the fabric exterior face layer 12. Again, with this application, no adhesive is required between the polyester sheet and the substrate, but rather depending on the exterior face layer, adhesive may be needed between the polyester and the exterior face layer. For headliner applications, an additional foam insert can be included into the composite laminate between the exterior face layer and the adhesive.

In a preferred embodiment, the polyester backing sheet is an open weave polyester, a non-woven product produced by Texon® and referred to as Texon 89, 90 and 91. Texon 89, 90 and 91 are non-woven insole materials developed specifically for footwear. The random fiber construction provides good internal bond strength which does not delaminate. The Texon insole product line further works well in conjunction with hot melt adhesives and neoprene adhesives to bond materials to the polyester material. In addition, the Texon materials readily accept injected plastics and have a high flex and abrasion resistance.

The preferred impregnated substrate is a cellulose impregnated thermoplastic resin sold under the tradename Formtex® and comprises a blend of cellulose fiber, an organic material and polyethylene. The inclusion of Formtex in the composite facilitates molding in various shapes and stiffness requirements and provides water resistance. The addition of a cellulose impregnated thermoplastic resin substrate, such as Formtex® creates a more wood-like product than a wholly plastic injection molded product. The resultant product resembles wood more closely both in terms of external appearance and sound characteristics. In addition, the tooling costs associated with the use of an impregnated substrate is significantly less since the tooling required is simply for compression of the material versus the tooling costs associated with injection molding the material.

Formtex® is self-laminating under heat and pressure. To activate the Formtex® material, a minimum of 175° C. followed by a minimum of 400 psi in a cold mold are needed. Higher temperatures and/or pressures can shorten cycle time and affect physical properties. With respect to the Formtex material, an individual layer prior to molding has a thickness of 0.048", a density of 0.40 g/OC and an average tensile strength of 400 psi. Following molding, at a pre-heat temperature of 200° C. for 2 minutes at 400 psi, the Formtex material has a thickness of 0.083", a density of 0.92 g/OC and an average tensile strength of 6800 psi. Accordingly, Formtex provides good molded stiffness, shorter cycle times than traditional wood forming, and results in a product that resembles wood much closer than an injection molded plastic substrate alone. The Formtex material is further nonhydroscopic, temperature stable and self-bonding upon application of heat and pressure.

While no adhesive is required between the open weave polyester backing sheet and the substrate, adhesives may be required between the polyester sheet and the exterior face material, such as for headliner applications. Adhesives used in the composite laminate are preferably in the form of film sheets. While liquid adhesives also function effectively, the increased cost associated with liquid adhesive application machines plus the increased material costs militate in favor of the use of adhesive film sheets. Furthermore, adhesive film sheets are easier to handle, and can be exactly cut to the desired shape to minimize waste. Most importantly, the use of adhesive film sheets creates less environmental hazards to operators, since there is no potential for breathing toxic fumes or vapors.

The preferred adhesive films are manufactured by Bemis Associates of Shirley, Massachusetts. Polyurethanes and polyester adhesive films have exhibited good results. The type of adhesive is selected depending on the materials which require bonding. For example, polyurethane adhesives work well with a wide range of materials and over a wide temperature range. In contrast, polyester adhesives create strong bonds at moderate seal conditions to a wide variety of substrates. Bemis Film Adhesive Stock Product Nos. 3218, 3248 and 5251 have served extremely well in applications.

One key determinative factor in the commercial success of a composite laminate involves its ability to satisfy relevant performance specifications. Accordingly, as an example, the composite laminate of this invention was tested under performance specifications set forth by General Motors for decorative interior wood components. The performance specifications set forth include appearance, hardness, heat age, humidity age, cycle test, cleanability, fogging, odor, wear resistance, resistance to scuffing and marring, surface coat adhesion and flamability.

In an effort to test the composite laminates, 11 wood grain plaques, 1 console assembly and 1 ashtray door were submitted for testing under the above-identified performance specifications.

As an example, for the heat aging test, one sample wood grain plaque was subjected to 168 hours at a temperature of 82° C. plus or minus 2° to determine whether after heat aging the material exhibited any surface tackiness, deterioration, color change or loss of adhesion. The tested sample exhibited no color or gloss changes or loss of adhesion and no surface tackiness or deterioration and thus passed the heat aging performance specification. The same wood grain plaque was subjected to humidity aging tests, where the plaque was exposed for 168 hours at a temperature of 38° C. plus or minus 2° and 95%RH plus or minus 3%. Again, following these humidity tests, the sample was inspected to determine whether any objectionable surface tackiness, deterioration, color change or loss of adhesion resulted—no such objectionable criteria was observed and thus the sample plaque passed the humidity age test.

The wood grain plaque sample further underwent cycle testing, wherein the wood grain plaque was exposed to two cycles of 16 hours at 38° C. plus or minus 2° and 95%RH plus or minus 3%, followed by 2 hours at room temperature; 16 hours at 82° C. plus or minus 2°; 2 hours at room temperature; and 4 hours at −30° C. plus or minus 2°. Following this cycle test, the wood grain sample plaque did not exhibit any objectionable distortion, warpage, sag, delamination or other undesirable effects and thus passed the test. In similar tests and procedures, the wood grain plaque sample submitted passed the abrasion resistance procedure, scuff and mar resistance procedure, adhesion procedure as received, adhesion procedure after humidity, flamability procedures, cleanability procedures, fogging procedures and/or odor procedures.

The composite sheet laminate of this invention thus offers several benefits over prior art composites: 1) the composite can be formed and bonded in one single step; 2) in general, the compression forming cycle, and thus the bonding cycle time, is approximately one minute; 3) the process for forming this composite sheet laminate results in significant cost savings in comparison to conventional wood forming, and yields a product without the changing expansion/contraction values associated with wood; 4) the use of a fiber impregnated substrate, preferably a cellulose-impregnated thermoplastic resin, results in a product which has the look, sound and overall feel of wood; 5) the use of a fiber impregnated substrate with a polyester backing sheet creates a temperature and moisture stable product, that is completely recyclable; 6) the composite laminate can be attached, for example, for automotive applications, using a variety of techniques such as mechanical bonding, heat staking and sonic welding; 7) the preferred composition of the substrate and backing sheet are both flexible, especially with the application of heat, and thus can be compression molded in a variety of designs; 8) the composite laminate sheet has sufficient structural integrity that aluminum reinforcements are not required; and 9) the composite laminate sheet meets the performance specifications of, for example, the automotive industry.

The present invention has been described in an illustrative manner. It is to be understood that the terminology which has been used is intended to be in the nature of description rather than of limitation. Many modifications and variations of the present invention are possible in light of the above teachings. Therefore, within the scope of the appended claims, the present invention may be practiced other than as specifically described.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A composite laminate, comprising:
   an exterior face layer having a top surface and a bottom surface, the exterior face layer selected from the group consisting of wood veneer, natural and synthetic fabrics, paper, vinyl films, card stock, formable metal sheets, and metal foils;
   a substrate in mating engagement with the bottom surface of the exterior face layer, the substrate comprised of fiber-impregnated plastic resin, wherein the impregnated fibers are selected from the group consisting of vegetable fibers, wood fibers and cellulose fibers;
   a polyester backing sheet in mating engagement with the substrate; and
   wherein the substrate and the polyester backing sheet are bonded with the use of a compressive force which eliminates the need for adhesive therebetween.

2. The composite laminate of claim 1, further comprising:
   an adhesive interposed between the bottom surface of the exterior face layer and the substrate.

3. The composite laminate of claim 1, wherein the plastic resin is a thermoplastic resin.

4. The composite laminate of claim 1, wherein the plastic resin is selected from the group consisting of polyolefins, nylons and phenolics.

5. The composite laminate of claim 4, wherein the plastic resin is selected from the group consisting of polyethylene, polypropylene, resoles, novolacs, nylon 6,6, and nylon 6,10.

6. The composite laminate of claim 2, wherein the adhesive is selected from the group consisting of sprayable adhesives, adhesive film sheets, glue paper and glue films.

7. A method of making a composite laminate, comprising:
   pre-heating a substrate, the substrate comprising a fiber-impregnated plastic resin, wherein the impregnated fibers are selected from the group consisting of vegetable fibers, wood fibers, and cellulose fibers;
   pre-heating a polyester sheet;
   placing the pre-heated polyester sheet between the pre-heated substrate and an exterior face layer selected from the group consisting of wood veneer, natural synthetic fabrics, paper, card stock, metal foils, vinyl films and formable metal sheets to form a composite; and cold pressing the composite to form a composite laminate.

8. A composite laminate for automotive headliners, comprising:

an exterior face layer having a top surface and a bottom surface, the exterior face layer selected from the group consisting of cotton, wool, felt and natural and synthetic fabrics;

a substrate comprised of a fiber-impregnated plastic resin, wherein the impregnated fibers are selected from the group consisting of vegetable fibers, wood fibers and cellulose fibers;

a polyester sheet interposed between the exterior face layer and the substrate, and wherein a compressive force is applied on the substrate and the polyester sheet to bond the two together.

9. The composite laminate of claim 8, further comprising an adhesive interposed between the bottom surface of the exterior face layer and the polyester sheet.

10. The composite laminate of claim 9 further comprising a layer of foam interposed between the adhesive and the exterior face layer.

* * * * *